(12) United States Patent
Vankamamidi et al.

(10) Patent No.: US 11,372,767 B2
(45) Date of Patent: Jun. 28, 2022

(54) SELECTIVELY PROCESSING STORAGE COMMANDS AT DIFFERENT GRANULARITIES BASED ON COMMAND TYPES

(71) Applicant: EMC IP Holding Company LLC, Hopkinton, MA (US)

(72) Inventors: Vamsi K. Vankamamidi, Hopkinton, MA (US); Philippe Armangau, Acton, MA (US); David Bernard, Westford, MA (US); Shari Vietry, Merrimack, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/084,085

(22) Filed: Oct. 29, 2020

(65) Prior Publication Data

US 2022/0138106 A1  May 5, 2022

(51) Int. Cl.
  *G06F 12/00* (2006.01)
  *G06F 13/00* (2006.01)
  *G06F 13/28* (2006.01)
  *G06F 12/0877* (2016.01)
  *G06F 12/0891* (2016.01)

(52) U.S. Cl.
  CPC ...... *G06F 12/0877* (2013.01); *G06F 12/0891* (2013.01); *G06F 2212/1024* (2013.01)

(58) Field of Classification Search
  CPC . G06F 12/0877; G06F 3/0659; G06F 12/0246
  USPC .......................................................... 711/3
  See application file for complete search history.

(56) References Cited

U.S. PATENT DOCUMENTS

| | | | |
|---|---|---|---|
| 10,318,178 B1 | 6/2019 | Feng et al. | |
| 10,545,668 B2 | 1/2020 | Feng et al. | |
| 10,761,993 B2 | 9/2020 | Li et al. | |
| 2014/0359245 A1* | 12/2014 | Jones | G06F 3/0665 711/170 |
| 2016/0216894 A1* | 7/2016 | Nango | G06F 12/0284 |
| 2019/0310796 A1* | 10/2019 | Perez | G06F 11/1469 |

* cited by examiner

*Primary Examiner* — Edward J Dudek, Jr.
*Assistant Examiner* — Sidney Li
(74) *Attorney, Agent, or Firm* — BainwoodHuang

(57) ABSTRACT

A method of operating a storage appliance is provided. The method includes (a) in response to the appliance receiving a first command to perform a first storage operation on a first plurality of blocks, storing a command record for each block of the first plurality in a cache, each command record respectively indicating an address of that block; (b) upon flushing the command record for each block of the first plurality from the cache to persistent storage, storing data of that block at its indicated address; (c) in response to the storage appliance receiving a second command to perform a second storage operation on a second plurality of blocks, storing, in the cache, an aggregated command record that indicates the second storage operation and an address range of the second plurality, the second storage operation representing an identical change to all blocks of the second plurality; and (d) upon flushing the aggregated command record from the cache to the persistent storage, performing the storage operation indicated by the aggregated command record over the address range indicated by the aggregated command record.

23 Claims, 6 Drawing Sheets

SELECTIVELY PROCESSING STORAGE COMMANDS AT DIFFERENT GRANULARITIES BASED ON COMMAND TYPES

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems use a set of software layers to process and translate storage requests from high-level commands into low-level operations that target specific regions of storage drives. Some of these systems include a cache that temporarily stores storage requests prior to fulfilment by the lower layers.

SUMMARY

Some storage systems break down storage requests aimed at large regions of data into separate storage commands on a per-block basis, storing each block-level storage command separately within cache. However, in the case of storage requests that treat an entire region the same (e.g., UNMAP and WRITESAME commands), much of the cached data is redundant. This means that these types of storage requests are limited to the same size and speed constraints as other storage requests, even though they could be processed with less storage and speed overhead.

Thus, there is a need for storage requests that treat an entire region the same to be processed differently from other storage requests in order to enhance their speed and reduce storage overhead. This need may be addressed, at least in part, by processing storage requests that treat entire regions the same at a larger granularity than other storage requests.

In one embodiment, a method of operating a storage appliance is provided. The method includes (a) in response to the storage appliance receiving a first command to perform a first storage operation on a first plurality of blocks managed by the storage appliance, storing a command record for each block of the first plurality in a cache of the storage appliance, each command record respectively indicating an address of that block; (b) upon flushing the command record for each block of the first plurality from the cache to persistent storage of the storage appliance, storing data of that block at its indicated address; (c) in response to the storage appliance receiving a second command to perform a second storage operation on a second plurality of blocks managed by the storage appliance, storing, in the cache, an aggregated command record that indicates the second storage operation and an address range of the second plurality of blocks, the second storage operation representing an identical change to all blocks of the second plurality; and (d) upon flushing the aggregated command record from the cache to the persistent storage, performing the storage operation indicated by the aggregated command record over the address range indicated by the aggregated command record. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for allowing storage requests that treat an entire region the same to be processed differently from other storage requests in order to enhance their speed and reduce storage overhead. This result may be accomplished by processing storage requests that treat entire regions the same at a larger granularity than other storage requests.

Figure 1:
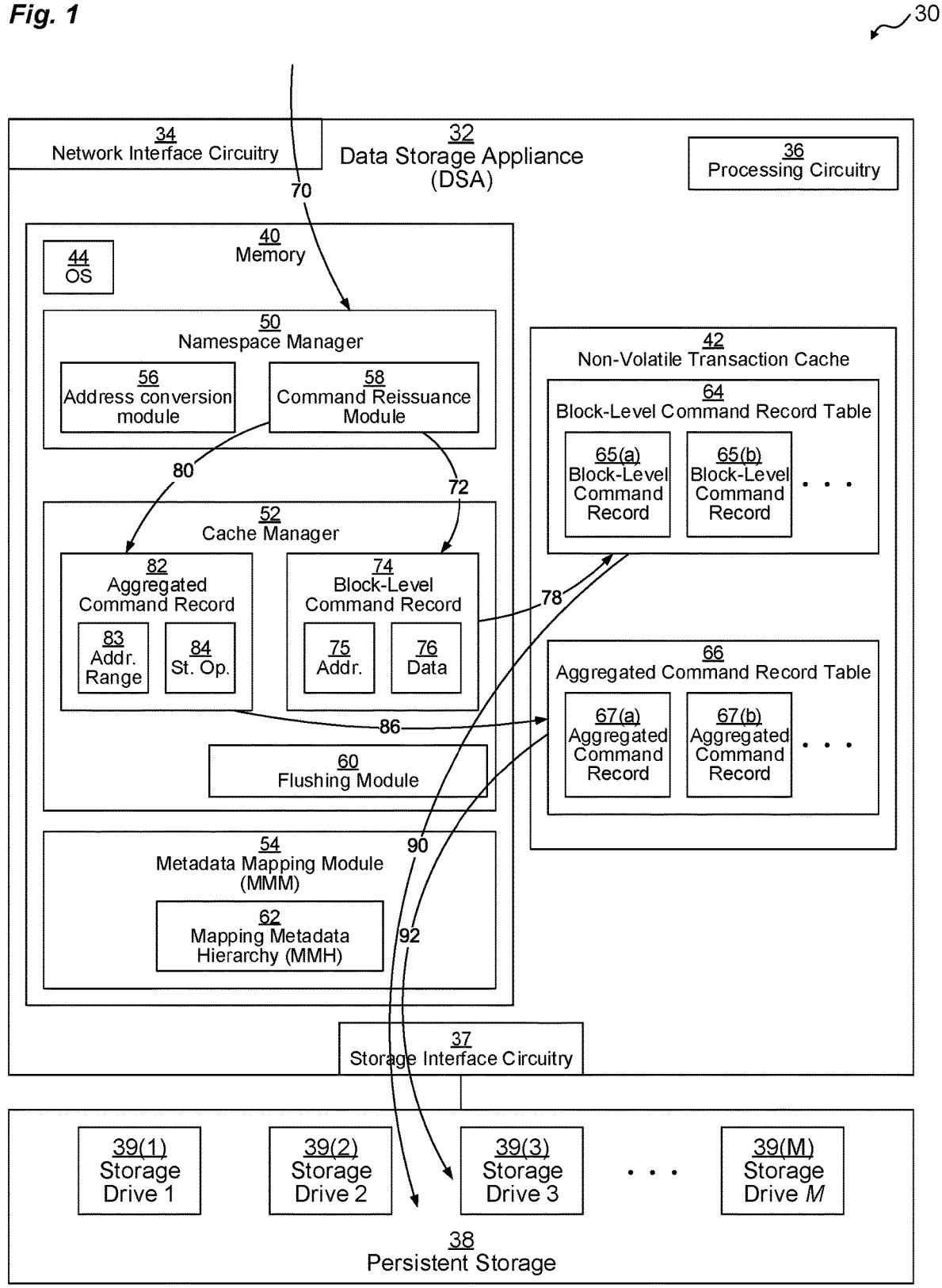
FIG. 1 is a block diagram depicting an example system, apparatus, and data structure arrangement for use in connection with various embodiments.

FIG. 1 depicts an example data storage system (DSS) 30. DSS 30 may be configured as one or more data storage appliances (DSAs) 32 in one or more housings. DSS 30 also includes persistent storage 38 communicatively coupled to the DSA 32.

DSA 32 may be any kind of computing device, such as, for example, a personal computer, workstation, server computer, enterprise server, data storage array device, laptop computer, tablet computer, smart phone, mobile computer, etc. In some example embodiments, DSA 32 is a blade server or a rack-mount server. In some embodiments, DSA 32 and the persistent storage 38 are both mounted on the same server rack. In some embodiments, DSA 32 and the persistent storage 38 are both mounted within a single blade or rack shelf. No particular physical configuration is required, however.

DSA 32 at least includes network interface circuitry 34, processing circuitry 36, storage interface circuitry 37, memory 40, and cache 42 (depicted as a non-volatile transaction cache). In some embodiments, DSA 32 may also include various other kinds of interfaces (not depicted) and interconnection circuitry between their various components (not depicted).

Processing circuitry 36 may include any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage devices 39 (depicted as storage drives 39(1), 39(2), 39(3), . . . , 39(M)), such as, for example, hard disk drives, solid-state storage devices (SSDs), flash drives, etc.

Network interface circuitry 34 may include one or more Ethernet cards, cellular modems, Fibre Channel (FC) adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc. Network interface circuitry 34 allows DSA 32 to communicate with one or more host devices (not depicted) over the network.

Memory 40 may be any kind of digital system memory, such as, for example, random access memory (RAM). Memory 40 stores an operating system (OS) 44 in operation (e.g., a Linux, UNIX, Windows, MacOS, or similar operating system). Memory 40 also stores an I/O stack (not depicted), which is a layered arrangement of drivers and/or other software constructs configured to process I/O storage requests, e.g., from remote hosts, directed at the DSA 32. The storage requests, at the top of the I/O stack, are high-level requests directed to particular logical disks and logical addresses therein. As the requests proceed down the stack, these are translated into lower-level access requests to particular physical addresses on drives 39 of the persistent storage 38. At a low level, persistent storage 38 stores a plurality of persistently-stored pages (not depicted), which may include user data pages and/or metadata pages and may also be referred to as "blocks." The I/O stack includes a namespace manager 50, a cache manager 52, and a mapping metadata module (MMM) 54, among other software modules (not depicted).

Namespace manager 50 may include an address conversion module 56 and a command reissuance module 58. Cache manager 52 manages the contents of the non-volatile transaction cache 42, and it includes a flushing module for flushing the contents of the non-volatile transaction cache 42 down the stack.

The metadata used to organize the user data stored on persistent storage 38 into specific locations on the plurality of logical disks 39 is contained within a Mapping Metadata Hierarchy (MMH) 62 of the MMM 54. The MMH 62 includes a plurality of metadata pages (not depicted in FIG. 1) arranged in a hierarchical manner. At least some of the metadata pages of MMH 62 are cached within MMM 54 in memory 40. In some embodiments, other metadata pages of the MMH 62 may be stored only on persistent storage 38, until needed. The entire MMH 62 may be stored on persistent storage 38, except to the extent that some of the cached metadata pages of the MMH 62 have not yet been flushed to persistent storage 38. Further detail with respect to the MMH 62 is described below in connection with FIG. 5.

Memory 40 may also store various other data structures used by the OS 42, namespace manager 50, cache manager 52, MMM 54, address conversion module 56, command reissuance module 58, flushing module 60, and various other applications and drivers. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the DSA 32 is powered off. The OS 42, namespace manager 50, cache manager 52, MMM 54, address conversion module 56, command reissuance module 58, flushing module 60, and various other applications and drivers are typically stored in this persistent storage portion of memory 40 or on persistent storage 38 so that they may be loaded into a system portion of memory 40 upon a system restart or as needed. The OS 42, namespace manager 50, cache manager 52, MMM 54, address conversion module 56, command reissuance module 58, flushing module 60, and various other applications and drivers, when stored in non-transitory form either in the volatile portion of memory 40 or on persistent storage 38 or in persistent portion of memory 40, each form a computer program product. The processing circuitry 36 running one or more applications thus forms a specialized circuit constructed and arranged to carry out the various processes described herein.

In example operation, a host issues a storage command 70 to the DSA 32. Storage command 70 is directed at a range of addresses (typically addresses that are logically-adjacent within a single data object, such as within a single logical disk or LUN). Storage command 70 may be, for example, a SCSI or NVMe command, as is well-known in the art. Storage command 70 indicates a storage operation to perform on the range of addresses, such as, for example, a write operation that includes a data buffer indicating what data to write to the range of addresses. As another example, the storage operation may indicate that the exact same action should be done to every block within the address range, such as a delete, UNMAP (which de-provisions a block in a thinly-provisioned system), or WRITESAME (which writes the same exact data to every block within the address range) operation.

In some embodiments, address conversion module 56 translates the address range of the storage command 70 into a set of addresses in a different address space. For example, in one embodiment, storage command 70 presents the address range in a local address space of a LUN and address conversion module 56 converts that local address range into a universal address range over a space that allows all LUNs managed by the DSA 32 to be addressed. For example, storage command 70 may indicate addresses 5-10 of LUN 3 (not depicted); if LUN 3 is assigned a set of addresses ranging from 8,192 to 24,576, then address conversion module 56 may translate the address range to 8,197-8,202. In one example embodiment, the universal address range may be an 8-petabyte (PB) range.

Command reissuance module 58 reissues one or more storage commands 72, 80 to the cache manager 52 in response to receiving the storage command 70. In the case of an ordinary storage operation (e.g., a write), command reissuance module 58 issues a separate block-level storage command 72 for each block within the address range. In the case of a storage operation that represents an identical change to all blocks of the address range, command reissuance module 58 may issue a combination of one or more aggregated storage commands 80 and/or block-level storage commands 72 (see below in connection with FIGS. 2 and 3A-3C for more detail).

A block-level storage command 72 includes an address 75 (e.g., within the universal address space) directed at a particular block. Each block has a fixed length, the exact length depending on the embodiment. In one embodiment, the block length is 4 kilobytes (KB). In various other example embodiments, the block length is a fixed length that may range between 512 bytes and 64 KB. In addition, block-level storage command 72 may include a storage operation 84 and/or data 76 to be written to that block. Upon receiving the block-level storage command 72, cache manager 52 creates a block-level command record 74 that includes the address 75 and the storage operation 84 and/or data 76, and then sends (step 86) the block-level command record 74 to the non-volatile transaction cache 42 for storage until it can be flushed. In some embodiments, cache manager 52 stores the block-level command record 74 as a block-level command record 65 within a block-level command record table 64 of the non-volatile transaction cache 42. In some embodiments, block-level command record table 64 may be configured as a hash table keyed by the address 75.

An aggregated storage command 80 includes an address range 83 directed at a particular range of consecutive addresses (e.g., within the universal address space). In some embodiments, the address range 83 has a fixed length, corresponding to a predetermined alignment interval, such as, for example, 1 megabyte (MB). In various other example embodiments, the alignment interval is a fixed length that may range between 1 MB and 8 MB. In addition, aggregated storage command 80 includes a storage operation 84 to be performed on all the blocks of that range (e.g., an UNMAP command or a WRITESAME command together with the data to be written). Upon receiving the aggregated storage command 80, cache manager 52 creates an aggregated command record (ACR) 74 that includes the address range 83 and the storage operation 84, and then sends (step 86) the ACR 82 to the non-volatile transaction cache 42 for storage until it can be flushed. In some embodiments, cache manager 52 stores the ACR 82 as an ACR 67 within an ACR table 66 of the non-volatile transaction cache 42. In some embodiments, ACR table 66 may be configured as a hash table keyed by the address range 83 (e.g., by the address of the first block in the address range 83 or by an index of the address range 83).

Upon storage in the non-volatile transaction cache 42 of all block-level storage commands 72 and ACRs 80 generated by the command reissuance module 58 in response to a storage command 70, namespace manager 50 may respond back to the issuing host to acknowledge the storage command 70.

Asynchronously with placing the block-level storage commands 72 and ACRs 80 into the non-volatile transaction cache 42, flushing module 60 operates to flush block-level storage commands 72 (step 90) and ACRs 80 (step 92) from the non-volatile transaction cache 42 down to the persistent storage 38 via the MMM 54.

Figure 2:
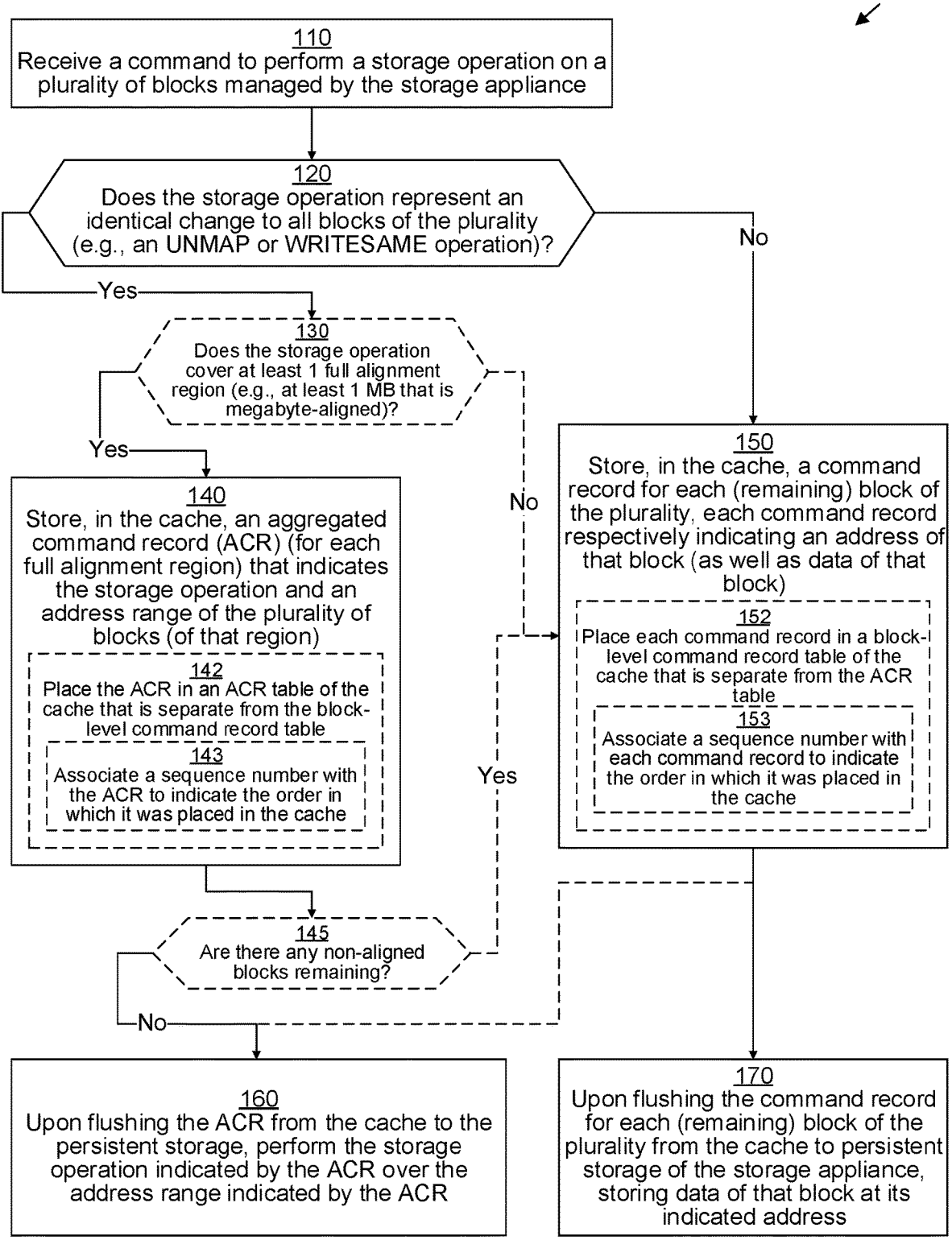
FIG. 2 is a flowchart depicting an example procedure according to various embodiments.

FIG. 2 illustrates an example method 100 performed by a DSA 32 for fulfilling storage commands 70. It should be understood that any time a piece of software (e.g., OS 42, namespace manager 50, cache manager 52, MMM 54, address conversion module 56, command reissuance module 58, flushing module 60, etc.) is described as performing a method, process, step, or function, what is meant is that a computing device (e.g., DSA 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a sub-step is either optional or representative of alternate embodiments or use cases.

In step 110, namespace manager 50 receives a command (i.e., storage command 70) to perform a storage operation 84 on a plurality of blocks managed by the DSA 32. For example, storage command 70 may be a SCSI command directed at a range of addresses of a LUN.

In step 120, command reissuance module 56 determines whether or not the storage operation 84 of the received storage command 70 represents an identical change to all of the plurality of blocks of the address range. If so, operation proceeds to optional step 130 or directly to step 140. Otherwise, operation proceeds to step 150. For example, in one embodiment, if the storage operation 84 is an UNMAP or a WRITESAME operation (or a delete operation), then operation proceeds to optional step 130 or directly to step 140; otherwise operation proceeds to step 150.

In optional step 130, command reissuance module 56 determines whether or not the address range of the received storage command 70 covers at least one full alignment region. In some embodiments, this is done after address conversion module 54 converts the address range into the universal address space.

Figure 3A:
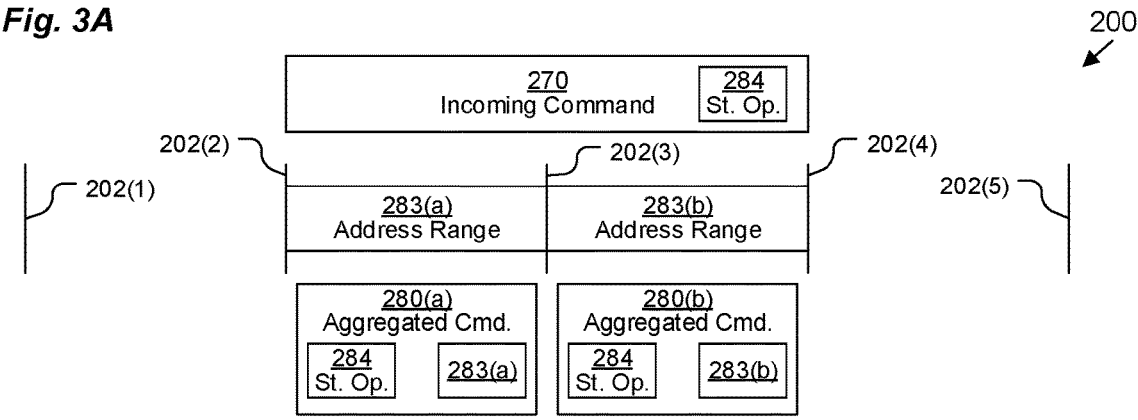
FIGS. 3A-3C are block diagrams depicting example data structure arrangements for use in connection with various embodiments.

An alignment region is an address range of a fixed size with predetermined boundaries. See FIGS. 3A-3C for an example illustration of alignment regions. FIG. 3A depicts an example arrangement 200 in which an incoming storage command 270 covers exactly two alignment regions. Alignment boundaries 202 are address boundaries within an address space (e.g., universal address space) that are spaced apart from each other by a fixed alignment interval, such as, for example, 1 megabyte (MB). Thus, for example, every address that is an integer multiple of 1 MB may be an alignment boundary 202. In various other example embodiments, the alignment interval is a fixed length that may range between 1 MB and 8 MB.

FIG. 3A depicts five consecutive alignment boundaries 202(1), 202(2), 202(3), 202(4), 202(5). Incoming command 270 covers blocks with addresses ranging from alignment boundary 202(2) to 202(4), so it covers two full alignment regions (address range 283(*a*) and address range 283(*b*)).

Figure 3B:
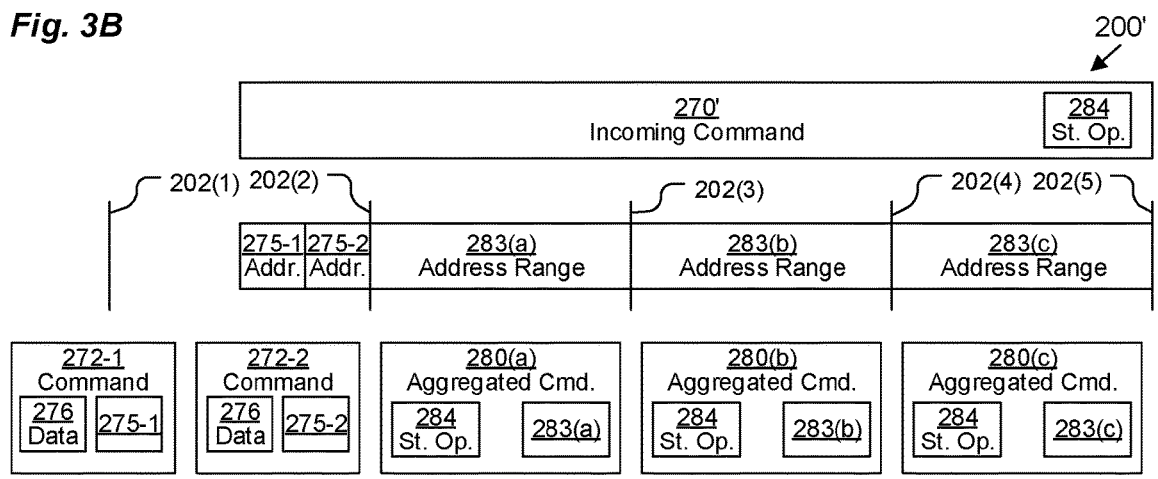

FIG. 3B depicts an example arrangement 200' in which an incoming storage command 270' covers just over three alignment regions. FIG. 3B depicts four consecutive alignment boundaries 202(1), 202(2), 202(3), 202(4). Incoming command 270' covers blocks with addresses ranging from address 275-1 (just below alignment boundary 202(2)) to alignment boundary 202(5), so it covers three full alignment regions (address ranges 283(*a*), 283(*b*), 283(*c*)) plus additional addresses 275-1, 275-2.

Figure 3C:
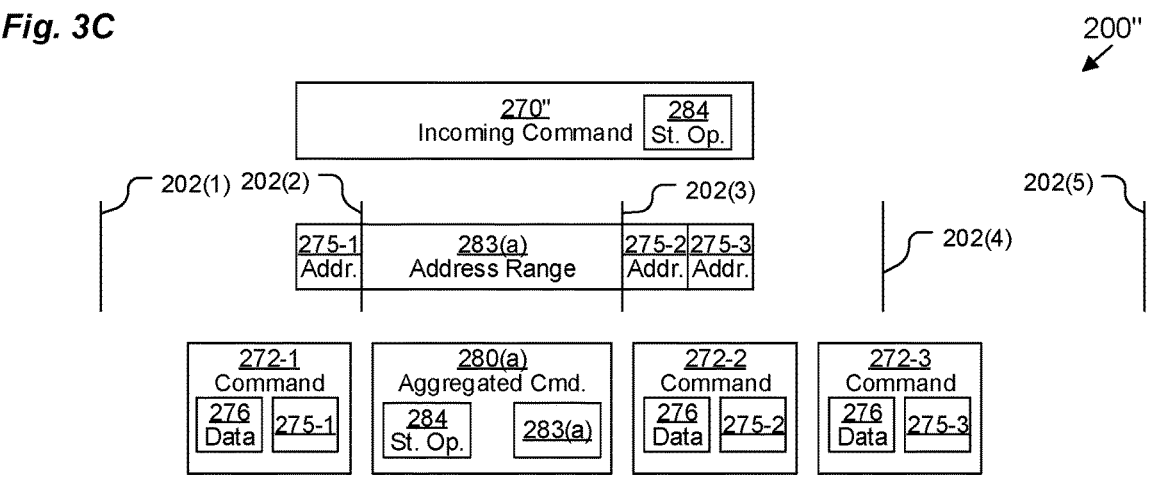

FIG. 3C depicts an example arrangement 200" in which an incoming storage command 270" covers just over one alignment region. FIG. 3C depicts four consecutive alignment boundaries 202(1), 202(2), 202(3), 202(4). Incoming command 270" covers blocks with addresses ranging from address 275-1 (just below alignment boundary 202(2)) to address 275-3 (just above alignment boundary 202(3)), so it covers one full alignment region (address range 283(*a*)) plus additional addresses 275-1, 275-2, 275-3.

Not depicted is an arrangement in which an incoming storage command 70 covers less than one alignment region (e.g., just addresses 275-1, 275-2 from FIG. 3B).

Returning to FIG. 2, if step 130 has an affirmative result, operation proceeds with step 140; otherwise operation proceeds with step 150. In embodiments in which step 130 is skipped, operation proceeds directly to step 140.

In step 140, DSA 32 stores an ACR 82 in the cache 42 that indicates the same storage operation 84 as the incoming storage command 70 as well as an address range 83. In embodiments in which step 130 was performed, a separate ACR 82 is stored for each full alignment region covered by the storage command 70. In some embodiments, step 140 is performed by command reissuance module 58 first issuing one or more aggregated storage commands 80 to the cache manager 52 and then, in optional sub-step 142, cache manager 52 converting the received aggregated storage commands 80 into respective ACRs 82 and storing them in the ACR table 66 of the cache 42.

Thus, for example, in the context of FIG. 3A, command reissuance module 58 reissues incoming command 270 as aggregated storage commands 280(a), 280(b) to the cache manager 52 with respective address ranges 283(a), 283(b), and both having the same storage operation 284 as the incoming command 270. Then cache manager 52 places two respective ACRs 82, corresponding to the two received aggregated storage commands 280(a), 280(b), into the ACR table 66 of the cache 42.

In some embodiments, sub-step 142 includes optional sub-step 144. In sub-step 144, cache manager 142 associates a sequence number 381 (see FIG. 4) with each ACR 82 as it places it in the ACR table 66 of the cache 44 to indicate the order in which it was placed in the cache 42.

After step 140, operation proceeds either with optional step 145 or directly with step 160. In step 145, command reissuance module 56 determines whether or not there are any remaining blocks of the original address range of the incoming storage command 70 that have not yet been accounted for by the issued aggregated storage commands 80. If so, those represent blocks that are not aligned to full alignment regions, so operation proceeds with step 150. Otherwise, operation proceeds with step 160.

Looking again at FIG. 3A, since there are no unaligned blocks addressed by the incoming storage command 270, step 150 is not performed in this context.

However, looking at FIG. 3B, although command reissuance module 58 reissues incoming command 270 as aggregated storage commands 280(a), 280(b), 280(c) to the cache manager 52 in step 140 with respective address ranges 283(a), 283(b), 283(c), all having the same storage operation 284 as the incoming command 270, there are two remaining unaligned blocks at addresses 275-1, 275-2. Thus, step 145 has an affirmative result, so operation proceeds with step 150.

Similarly, looking at FIG. 3C, although command reissuance module 58 reissues incoming command 270 as aggregated storage command 280(a) to the cache manager 52 in step 140 with address range 283(a) and the same storage operation 284 as the incoming command 270, there are three remaining unaligned blocks at addresses 275-1, 275-2, 275-3. Thus, step 145 has an affirmative result, so operation proceeds with step 150.

Returning to FIG. 2, step 150 may be performed either in response to the storage operation 84 (e.g., a write operation) not representing an identical change to all blocks (i.e., a negative result from step 120) or in response to there being any non-aligned blocks covered by the storage command 70 (i.e., a negative result from step 130 or an affirmative result from step 145). In step 150, DSA 32 stores a block-level command record 74 in the cache 42 for each block covered by the storage command 70 that was not already covered by step 140, each block-level command record 74 respectively indicating an address 75 of that block. In some cases (e.g., for a standard write operation or for a WRITESAME operation), the block-level command records 74 will also include respective data 76 to be written to that block. In other cases (e.g., for an UNMAP or delete operation), the block-level command records 74 will also include the storage operation 84 to be performed on that block. In some embodiments, step 150 is performed by command reissuance module 58 first issuing one or more block-level storage commands 72 to the cache manager 52 and then, in optional sub-step 152, cache manager 52 converting the received block-level storage commands 72 into respective block-level commands records 74 and storing them in the block-level command table 64 of the cache 42.

Thus, for example, in the context of FIG. 3B, in step 140, command reissuance module 58 reissues incoming command 270' as aggregated storage commands 280(a), 280(b), and in step 150, command reissuance module 58 reissues the rest of incoming command 270' as block-level storage commands 272-1, 272-2 to the cache manager 52 with respective addresses 275-1, 275-2 and with respective data buffers 276 drawn from the incoming command 270'. Then cache manager 52 places two respective block-level command records 74, corresponding to the two received block-level storage commands 272-1, 272-2, into the block-level command record table 64 of the cache 42.

Similarly, in the context of FIG. 3C, in step 140, command reissuance module 58 reissues incoming command 270" as aggregated storage command 280(a), and in step 150, command reissuance module 58 reissues the rest of incoming command 270" as block-level storage commands 272-1, 272-2, 272-3 to the cache manager 52 with respective addresses 275-1, 275-2, 275-3 and with respective data buffers 276 drawn from the incoming command 270". Then cache manager 52 places three respective block-level command records 74, corresponding to the three received block-level storage commands 272-1, 272-2, 272-3, into the block-level command record table 64 of the cache 42.

Returning to FIG. 2, step 160 follows step 140 (or 145), and step 170 follows step 159. It should be noted that steps 160 and 170 may be performed asynchronously, so they may not be performed directly in response to steps 140, 170, respectively.

In step 170, upon flushing module 60 flushing a block-level storage command record 65 from the cache (e.g., from block-level command record table 64), DSA 32 stores data 76 in (or performs the storage operation 84 on) the block pointed to by the address 75 indicated by that block-level storage command record 65. It should be understood that step 170 may be performed by a combination of flushing module 60, MMM 54, and other lower-layer drivers (not depicted).

Figure 4:
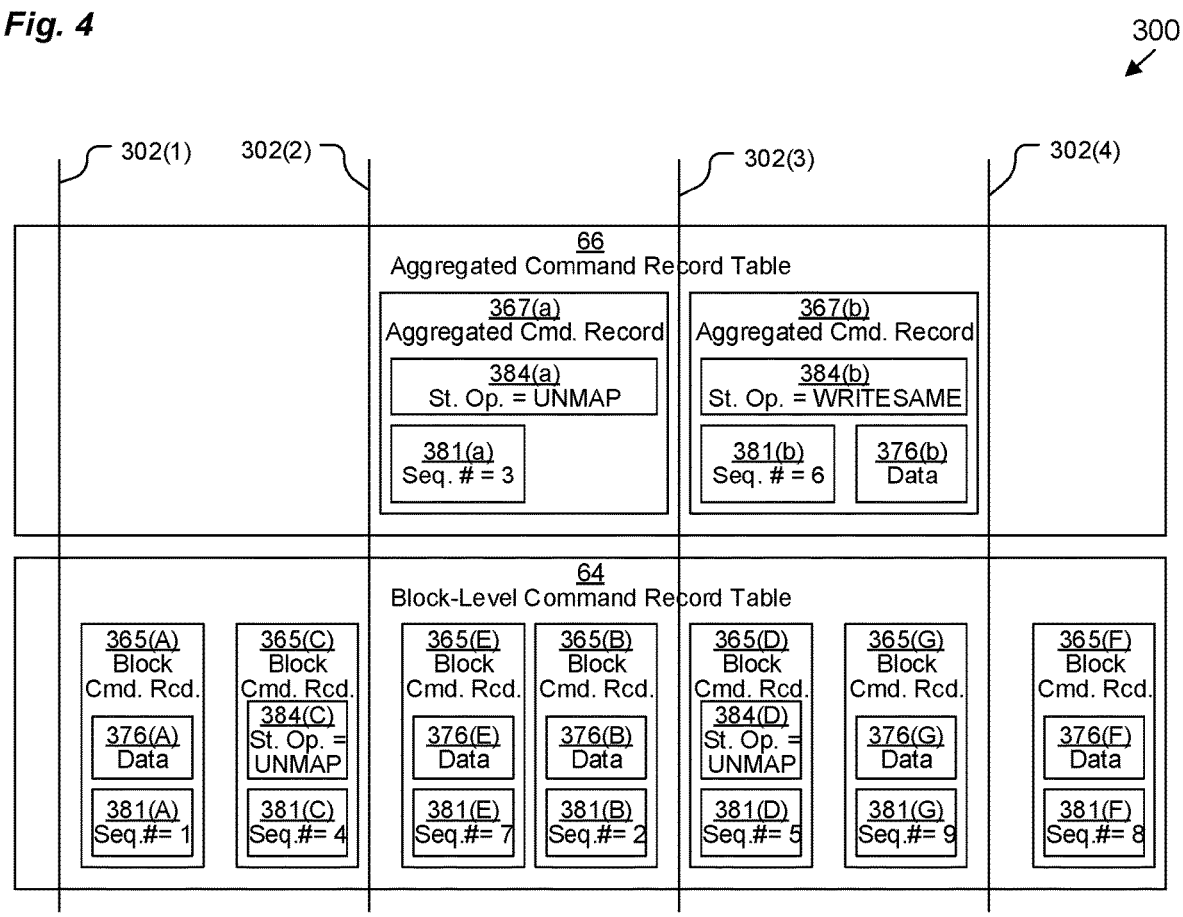
FIG. 4 is a block diagram depicting an example data structure arrangement for use in connection with various embodiments.

Thus, for example, with reference to the arrangement 300 of FIG. 4, upon flushing module 60 flushing block-level storage command record 365(A) from block-level command record table 64), DSA 32 stores data 376 in the block pointed to by the address 75 indicated by the position of that block-level storage command record 365(A) within the block-level command record table 64. Similarly, upon flushing module 60 flushing block-level storage command record 365(C) from block-level command record table 64), DSA 32 performs the storage operation 384(C) (i.e., UNMAP) on the block pointed to by the address 75 indicated by the position of that block-level storage command record 365(C) within the block-level command record table 64.

In step 180, upon flushing module 60 flushing an ACR 67 from the cache (e.g., from ACR table 66), DSA 32 performs the storage operation 84 indicated by that ACR 67 over the address range 83 indicated by that ACR 67. It should be understood that step 180 may be performed by a combination of flushing module 60, MMM 54, and other lower-layer drivers (not depicted).

Thus, for example, with reference to the arrangement 300 of FIG. 4, upon flushing module 60 flushing ACR 367(*a*) from ACR table 66), DSA 32 performs the storage operation 384(*a*) (i.e., UNMAP) on the blocks within the address range indicated by the position of that ACR 367(*a*) within the ACR table 66 (i.e., from alignment boundary 302(2) to alignment boundary 302(3)).

Figure 5:
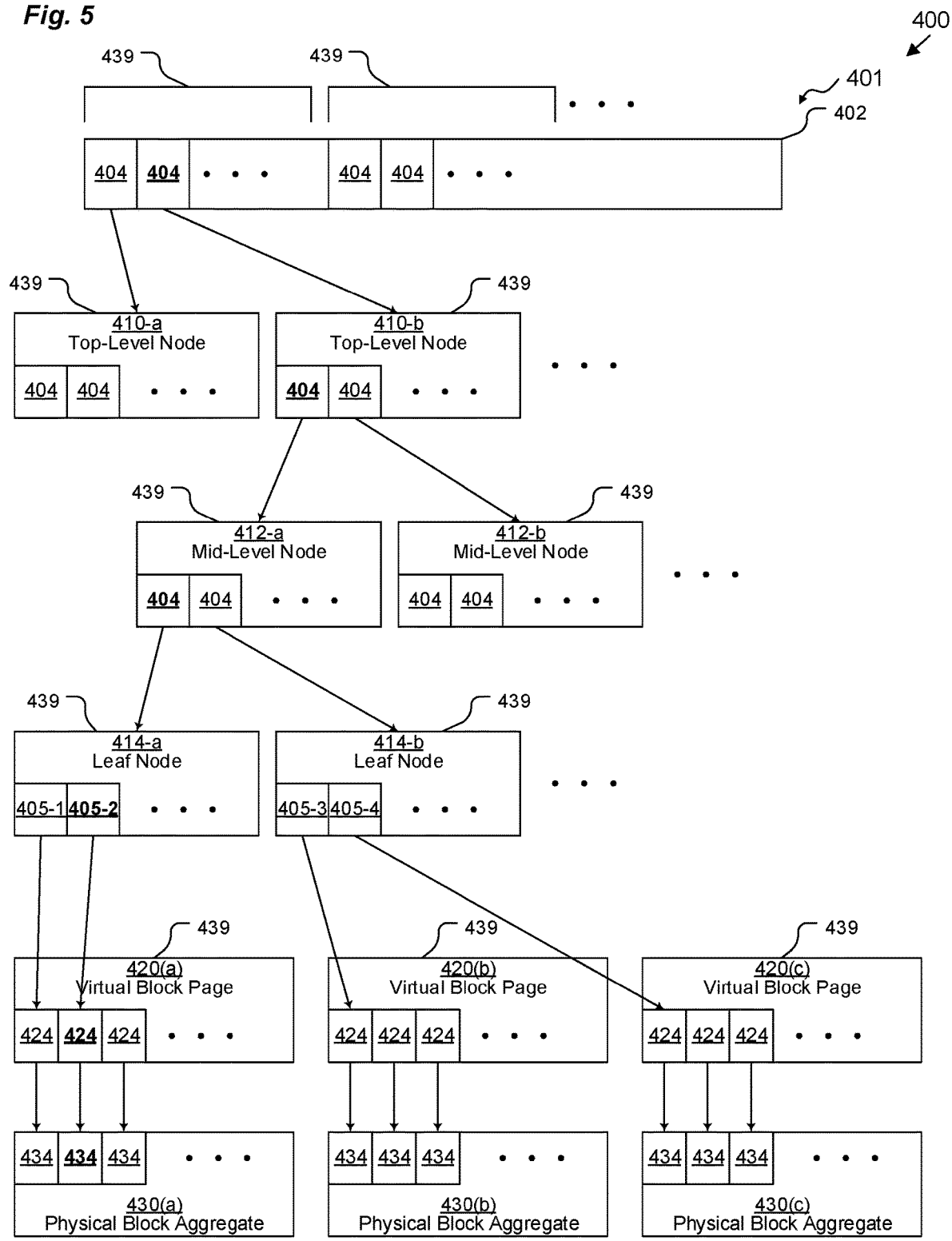
FIG. 5 is a block diagram depicting an example data structure arrangement for use in connection with various embodiments.

FIG. 5 depicts an example data structure arrangement 400 in the context of performing a READ operation on user data stored in the persistent storage 38. Arrangement 400 includes an MMH 401 for locating blocks 434 of user data.

MMH 401 is a collection of B-trees (or a B-tree-like structures), and it includes a root structure 402, a set of top-level nodes 410 (depicted as top-level nodes 410-*a*, 410-*b*, . . . ), a set of mid-level nodes 412 (depicted as mid-level nodes 412-*a*, 412-*b*, . . . ), a set of leaf nodes 414 (depicted as leaf nodes 414-*a*, 414-*b*, . . . ), and a set of virtual block pages (depicted as virtual block pages 420(*a*), 420(*b*), 420(*c*), . . . ). Position within the MMH 401 indicates an address or address range.

The MMH 401 may address a very large logical address space, such as, for example eight PB. Each entry in the root structure 402 is a node pointer 404 that points to a top-level node 410. A top-level node 410 contains a plurality of node pointers 404 that each point to a mid-level node 412. A mid-level node 412 contains a plurality of node pointers 404 that each point to a leaf node 414. A leaf node 414 contains a plurality of virtual block pointers 405 that each point to a virtual block entry 424 within a virtual block page 420. As depicted each node 410, 412, 414 is implemented as a metadata page 439. In some embodiments, each metadata page 439 is four kilobytes (KB), holding up to 512 node pointers 404 or virtual block pointers 405 plus a header and/or footer. The root structure 402 may also be made up of a plurality of metadata pages 439, each of which stores 512 node pointers 404.

Each virtual block page 420 is made up of one or more metadata page 439 containing a plurality of virtual block entries 424. Each virtual block entry 424 points to a user data block 434, and several user data blocks 434 may be aggregated together into a physical block aggregate 430.

In one embodiment, a physical block aggregate 430 is 2 MB, and a physical block 434 is 4 KB. In some embodiments, each physical block 434 may be compressed, allowing up to 2048 compressed physical blocks 434 to be stored within a single physical block aggregate 430.

As depicted, a storage operation is directed at the second physical block 434 from the left within physical block aggregate 430(*a*), which has a logical address corresponding to the position of pointer 405-2 (part of leaf node 414-*a*) within the MMH 401. In order to read that physical block 434, it must be located, which involves traversing the metadata tree 401 and reading several metadata pages 439 along the way, including one metadata page 439 of each of the root structure 402, top-level node 410-*b*, mid-level node 412-*a*, leaf node 414-*a*, and virtual block page 420(*a*).

Figure 6:
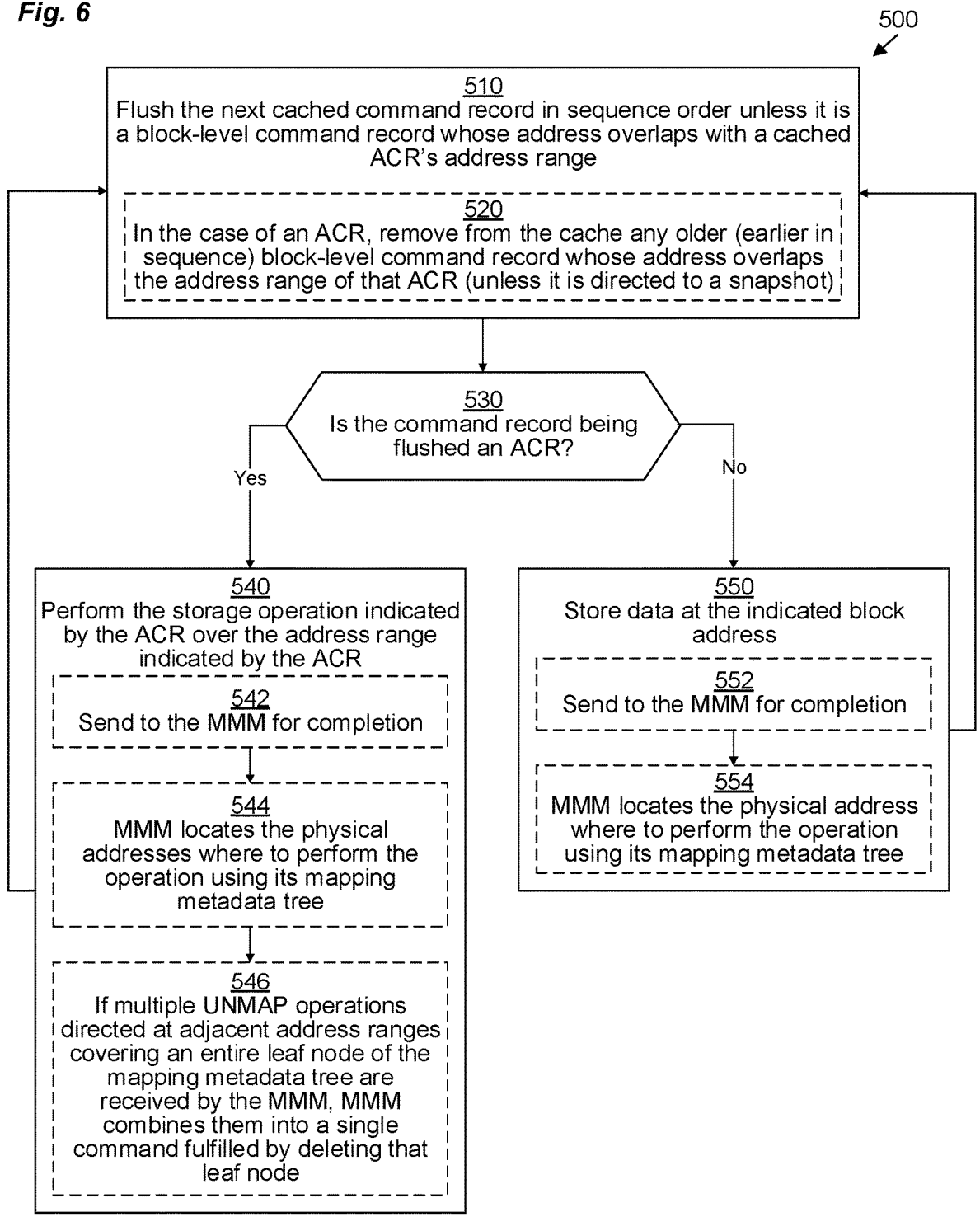
FIG. 6 is a flowchart depicting an example procedure according to various embodiments.

FIG. 6 illustrates an example method 500 performed by a DSA 32 for flushing command records 65, 67 from the cache 42 to the persistent storage 38. It should be understood that, in some embodiments, method 500 may implement both steps 160 and 170 of method 100. Method 500 may operate in the background asynchronously with the other steps of method 100. It should be understood that one or more of the steps or sub-steps of method 500 may be omitted in some embodiments. Similarly, in some embodiments, one or more steps or sub-steps may be combined together or performed in a different order. Dashed lines indicate that a sub-step is either optional or representative of alternate embodiments or use cases.

In step 510, flushing module 60 flushes the next cached command record 65, 67 in sequence order unless it is a block-level command record 65 whose address 75 overlaps with the address range 83 of a cached ACR 67. In some embodiments, step 510 includes sub-step 520. In sub-step 520, when flushing an ACR 67, flushing module 60 removes from the cache 42 any older (i.e., having a lower sequence number 381) block-level command record 65 whose address 75 overlaps with the address range 83 of the ACR 67 currently being flushed. However, sub-step 520 may be skipped in the event that the overlapping block-level command record 65 is directed to a block that still needs to be written to a snapshot taken after the overlapping block-level command record 65 was cached but before the ACR 67 currently being flushed was cached.

Looking at FIG. 4, flushing module 60 first flushes (step 510) block-level command record 365(A), since it has the lowest sequence number 381 of any of the command records 365, 367 currently in the block-level command record table 64 or ACR table 66—its sequence number 381(A) is 1. Next (after performing steps 530, 550 of method 500 to flush that block-level command record 365(A)), flushing module 60 skips block-level command record 365(B) even though its sequence number 381(B) is 2, which is next in sequence, because its address 75 (between alignment boundaries 302 (2), 302(3)) overlaps with ACR 367(*a*). Next, flushing module 60 flushes (step 510) ACR 367(*a*) because its sequence number 381(*a*) is 3, which is next in sequence. In sub-step 520, flushing module 60 removes (or retires) the older overlapping block-level command record 365(B) from the block-level command record table 64 since it has been superseded by the newer overlapping ACR 367(*a*). However, flushing module 60 does not remove the newer overlapping block-level command record 365(E) from the block-level command record table 64 because it supersedes ACR 367(*a*). Next (after performing steps 530, 540 of method 500 to flush that ACR 367(*a*)), flushing module 60 flushes (step 510) block-level command record 365(C), because its sequence number 381(C) is 4, which is next in sequence.

Next (after performing steps 530, 550 of method 500 to flush that block-level command record 365(C)), flushing module 60 skips block-level command record 365(D) even though its sequence number 381(D) is 5, which is next in sequence, because its address 75 (between alignment boundaries 302(3), 302(4)) overlaps with ACR 367(*b*). Next, flushing module 60 flushes (step 510) ACR 367(*b*) because its sequence number 381(*b*) is 6, which is next in sequence. In sub-step 520, flushing module 60 removes (or retires) the older overlapping block-level command record 365(D) from the block-level command record table 64 since it has been superseded by the newer overlapping ACR 367(*b*). However, flushing module 60 does not remove the newer overlapping block-level command record 365(G) from the block-level command record table 64 because it supersedes ACR 367(*b*). Next (after performing steps 530, 540 of method 500 to flush that ACR 367(*b*)), flushing module 60 flushes (step 510) block-level command record 365(E), because its sequence number 381(E) is 7, which is next in sequence; this partially undoes ACR 367(*a*). Next (after performing steps 530, 550 of method 500 to flush that block-level command record 365(E)), flushing module 60 flushes (step 510) block-level command record 365(F), because its sequence number 381(F) is 8, which is next in sequence. Next (after performing steps 530, 550 of method 500 to flush that block-level command record 365(F)), flushing module 60 flushes (step 510) block-level command record 365(G), because its sequence number 381(G) is 9, which is next in sequence; this partially undoes ACR 367(b).

Returning to FIG. 6, after step 510, operation proceeds with step 530. In step 530, flushing module 60 determines whether or not the storage command record currently being flushed (identified in step 510) is an ACR 67; if so, operation proceeds with step 540; otherwise operation proceeds with step 550.

In step 540, DSA 32 performs the storage operation 84 indicated by the ACR 67 currently being flushed over the address range 83 indicated by that ACR 67. In some embodiments, step 540 includes sub-steps 542-546.

In sub-step 542, flushing module 60 sends that ACR 67 to the MMM 54. Upon receiving that ACR 67, in sub-step 544, MMM 54 locates a low-level addresses where the storage operation 84 is to be performed using the address range 83 and the MMH 62, 401. Thus, by traversing the MMH 401 for an address of the address range 83, MMM 54 is able to identify a particular virtual block pointer 405 within a particular leaf node 414 that corresponds to the beginning of the address range.

In sub-step 546, if the storage operation 84 is an UNMAP operation, then MMM 54 determines whether it has also received any other ACRS 67 that also encode UNMAP operations with adjacent address ranges 83 such that by combining ACRs 67, an entire leaf node 414 can be unmapped. If so, MMM 54 combines those ACRS 67 together for joint execution. For example, in an embodiment in which each leaf node 414 represents 2 MB of storage space (e.g., each leaf node includes 512 virtual block pointers 405, each of which points to a virtual block entry 424 that points to a 4-KB block) and in which the address range 83 of ACRs 67 is 1 MB, then two adjacent ACRs 67 may both cover an entire leaf node 414. In such a case, both ACRS 67 may be fulfilled by simply deleting that leaf node (although, due to use of deduplication, it should be understood that it may be necessary to decrement reference counts for the virtual block entries 424 pointed to by the virtual block pointers 405 of that leaf node 414 and then to garbage collect user data blocks 434 whose respective virtual block entries 424 have zero remaining references). This represents an efficiency over the prior art because rather than invalidating each virtual block pointers 405 of that leaf node 414 separately, the entire leaf node 414 may be deleted at once.

In step 550, DSA 32 stores the data 76 at or performs the storage operation 84 on the address 75 indicated by that block-level command record 65. In some embodiments, step 550 includes sub-steps 552-554.

In sub-step 552, flushing module 60 sends that block-level command record 65 to the MMM 54. Upon receiving that block-level command record 65, in sub-step 554, MMM 54 locates a low-level addresses where the storage operation 84 is to be performed or where the data 76 is to be written using the address range 83 and the MMH 62, 401. Thus, by traversing the MMH 401 for an address of the address range 83, MMM 54 is able to identify a particular virtual block pointer 405 within a particular leaf node 414 that corresponds to the address 75.

With reference to FIG. 4, MMM 54 fulfills block-level command record 365(A) by locating the address 75 of that block-level command record 365(A), which it does by looking at the position of that block-level command record 365(A) within the block-level command record table 64. Once it has the address 75, MMM 54 traverses the MMH 401 to find the particular virtual block pointer 405 that it corresponds to. Then, MMM 54 causes that virtual block pointer 405 to no longer point to the virtual block entry 424 that it used to point to (decrementing its reference count for garbage collection purposes), and instead has that virtual block pointer 405 point to a different virtual block entry 424. The different virtual block entry 424 may be a preexisting one in case the data 76 has already been written elsewhere due top deduplication or it may be a new virtual block entry 424 in a new virtual block page 420 that points to a location in persistent storage 38 where the data 76 is about to be newly-written.

With further reference to FIG. 4, MMM 54 fulfills block-level command record 365(C) by locating the address 75 of that block-level command record 365(C), which it does by looking at the position of that block-level command record 365(C) within the block-level command record table 64. Once it has the address 75, MMM 54 traverses the MMH 401 to find the particular virtual block pointer 405 that it corresponds to. Then, MMM 54 causes that virtual block pointer 405 to no longer point to the virtual block entry 424 that it used to point to (decrementing its reference count for garbage collection purposes). However, since block-level command record 365(C) indicates that its storage operation is an UNMAP operation, no new data 76 is written, and that virtual block pointer 405 is left null.

Thus, techniques have been presented for allowing storage requests that treat an entire region the same (e.g., UNMAP or WRITESAME operations) to be processed differently from other storage requests (e.g., standard write operations) in order to enhance their speed and reduce storage overhead. This result may be accomplished by processing these special storage requests to be cached at a larger granularity (e.g., 1-MB) than other storage requests (which may be processed, for example, at 4-KB granularity).

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of operating a storage appliance, the method comprising:
    in response to the storage appliance receiving a first command to perform a first storage operation on a first plurality of blocks managed by the storage appliance, storing a command record for each block of the first plurality of blocks in a cache of the storage appliance, each command record respectively indicating an address of that block;
    upon flushing the command record for each block of the first plurality of blocks from the cache to persistent storage of the storage appliance, storing data of that block at its indicated address;
    in response to the storage appliance receiving a second command to perform a second storage operation on a second plurality of blocks managed by the storage appliance, storing, in the cache, an aggregated command record that indicates the second storage operation and an address range of the second plurality of blocks, the second storage operation representing an identical change to all blocks of the second plurality of blocks, wherein the first plurality of blocks and the second plurality of blocks exist within a universal address space; and
    upon flushing the aggregated command record from the cache to the persistent storage, performing the storage operation indicated by the aggregated command record over the address range indicated by the aggregated command record.

2. The method of claim 1 wherein the second plurality of blocks are adjacent to each other within a data object managed by the storage appliance, the second plurality of blocks beginning and ending aligned to alignment boundaries within an address space of the data object.

3. The method of claim 2,
    wherein the second command also commands performance of the second storage operation on additional blocks adjacent to the plurality of blocks within the address space of the data object outside of the alignment boundaries; and
    wherein the method further comprises:
        in response to the storage appliance receiving the second command, storing an additional command record for each block of the additional blocks in the cache, each additional command record respectively indicating an address of that block; and
        upon flushing the additional command record for each block of the additional blocks from the cache to the persistent storage, storing data of that block at its indicated address.

4. The method of claim 2,
    wherein the blocks within the data object managed by the storage appliance are located within the persistent storage with reference to a mapping tree indexed by their respective addresses, the mapping tree including leaf nodes that address a predetermined number of blocks that are adjacent within the address space of the data object, the blocks having a fixed block size;
    wherein the alignment boundaries are separated by a fixed interval within the address space of the data object, the fixed interval being a unit fraction of the predetermined number of blocks multiplied by the fixed block size; and
    wherein performing the storage operation indicated by the aggregated command record over the address range indicated by the aggregated command record includes:
        combining multiple aggregated command records having adjacent address ranges, the adjacent address ranges covering one entire leaf node of the mapping tree and the storage operation indicated by each of the multiple aggregated command records being an UNMAP command; and
        deleting the one entire leaf node from the mapping tree.

5. The method of claim 4,
    wherein the predetermined number of blocks multiplied by the fixed block size is within a range of 1 megabyte (MB) to 16 MB; and
    wherein the fixed interval is within a range of 1 MB to 8 MB.

6. The method of claim 2,
    wherein storing the aggregated command record in the cache includes storing the aggregated command record within an aggregated command record table of the cache;
    wherein storing the command record for each block of the first plurality of blocks in the cache includes storing the command record for each block of the first plurality of blocks within a command record table of the cache separate from the aggregated command record table;
    wherein each of the aggregated command records and the command records stored in the cache includes a respective sequence number assigned based on when it was stored in the cache; and
    wherein the method further comprises:
        for a first command record stored in the command record table that (a) indicates a first address that is within an address range indicated by an overlapping aggregated command record stored within the aggregated command record table and (b) has a sequence number older than the sequence number of the overlapping aggregated command record, deleting the first command record from the cache without flushing it to the persistent storage; and
        for a second command record stored in the command record table that (a) indicates a second address that is within the address range indicated by the overlapping aggregated command record and (b) has a sequence number newer than the sequence number of the overlapping aggregated command record, flushing the second command record from the cache after flushing the overlapping aggregated command record to the persistent storage.

7. The method of claim 2,
wherein storing the aggregated command record in the cache includes storing the aggregated command record within an aggregated command record table of the cache; and
wherein storing the command record for each block of the first plurality of blocks in the cache includes storing the command record for each block of the first plurality of blocks within a command record table of the cache separate from the aggregated command record table.

8. The method of claim 7 wherein the method further comprises:
for a first command record stored in the command record table that (a) indicates a first address that is within an address range indicated by an overlapping aggregated command record stored within the aggregated command record table and (b) was stored in the cache prior to the overlapping aggregated command record, deleting the first command record from the cache without flushing it to the persistent storage; and
for a second command record stored in the command record table that (a) indicates a second address that is within the address range indicated by the overlapping aggregated command record and (b) was stored in the cache after the overlapping aggregated command record, flushing the second command record from the cache after flushing the overlapping aggregated command record to the persistent storage.

9. The method of claim 1 wherein the second storage command is an UNMAP command.

10. The method of claim 1 wherein the second storage command is a WRITESAME command.

11. The method of claim 1 wherein storing the aggregated command record in the cache includes:
creating the aggregated command record by issuing a command that indicates the second storage operation and an address range of the second plurality of blocks; and
storing the issued command as the aggregated command record in the cache.

12. A data storage appliance comprising:
persistent storage for storing user data;
a cache; and
processing circuitry coupled to memory configured to:
in response to the data storage appliance receiving a first command to perform a first storage operation on a first plurality of blocks managed by the data storage appliance, store a command record for each block of the first plurality of blocks in the cache, each command record respectively indicating an address of that block;
upon flushing the command record for each block of the first plurality of blocks from the cache to the persistent storage, store data of that block at its indicated address;
in response to the data storage appliance receiving a second command to perform a second storage operation on a second plurality of blocks managed by the data storage appliance, store, in the cache, an aggregated command record that indicates the second storage operation and an address range of the second plurality of blocks, the second storage operation representing an identical change to all blocks of the second plurality of blocks, wherein the first plurality of blocks and the second plurality of blocks exist within a universal address space; and
upon flushing the aggregated command record from the cache to the persistent storage, perform the storage operation indicated by the aggregated command record over the address range indicated by the aggregated command record.

13. The data storage appliance of claim 12 wherein the second plurality of blocks are adjacent to each other within a data object managed by the data storage appliance, the second plurality of blocks beginning and ending aligned to alignment boundaries within an address space of the data object.

14. The data storage appliance of claim 13,
wherein the second command also commands performance of the second storage operation on additional blocks adjacent to the plurality of blocks within the address space of the data object outside of the alignment boundaries; and
wherein the processing circuitry coupled to memory is further configured to:
in response to the data storage appliance receiving the second command, store an additional command record for each block of the additional blocks in the cache, each additional command record respectively indicating an address of that block; and
upon flushing the additional command record for each block of the additional blocks from the cache to the persistent storage, store data of that block at its indicated address.

15. The data storage appliance of claim 13,
wherein the blocks within the data object managed by the data storage appliance are located within the persistent storage with reference to a mapping tree indexed by their respective addresses, the mapping tree including leaf nodes that address a predetermined number of blocks that are adjacent within the address space of the data object, the blocks having a fixed block size;
wherein the alignment boundaries are separated by a fixed interval within the address space of the data object, the fixed interval being a unit fraction of the predetermined number of blocks multiplied by the fixed block size; and
wherein performing the storage operation indicated by the aggregated command record over the address range indicated by the aggregated command record includes:
combining multiple aggregated command records having adjacent address ranges, the adjacent address ranges covering one entire leaf node of the mapping tree and the storage operation indicated by each of the multiple aggregated command records being an UNMAP command; and
deleting the one entire leaf node from the mapping tree.

16. The data storage appliance of claim 15,
wherein the predetermined number of blocks multiplied by the fixed block size is within a range of 1 megabyte (MB) to 16 MB; and
wherein the fixed interval is within a range of 1 MB to 8 MB.

17. The data storage appliance of claim 13,
wherein storing the aggregated command record in the cache includes storing the aggregated command record within an aggregated command record table of the cache;

wherein storing the command record for each block of the first plurality of blocks in the cache includes storing the command record for each block of the first plurality of blocks within a command record table of the cache separate from the aggregated command record table;

wherein each of the aggregated command records and the command records stored in the cache includes a respective sequence number assigned based on when it was stored in the cache; and wherein the processing circuitry coupled to memory is further configured to:

for a first command record stored in the command record table that (a) indicates a first address that is within an address range indicated by an overlapping aggregated command record stored within the aggregated command record table and (b) has a sequence number older than the sequence number of the overlapping aggregated command record, delete the first command record from the cache without flushing it to the persistent storage; and for a second command record stored in the command record table that (a) indicates a second address that is within the address range indicated by the overlapping aggregated command record and (b) has a sequence number newer than the sequence number of the overlapping aggregated command record, flush the second command record from the cache after flushing the overlapping aggregated command record to the persistent storage.

18. A computer program product comprising a non-transitory computer-readable storage medium storing a set of instructions, which, when performed by a computing device, causes the computing device to:

in response to the computing device receiving a first command to perform a first storage operation on a first plurality of blocks managed by the computing device, store a command record for each block of the first plurality of blocks in a cache of the computing device, each command record respectively indicating an address of that block;

upon flushing the command record for each block of the first plurality of blocks from the cache to persistent storage of the computing device, store data of that block at its indicated address;

in response to the computing device receiving a second command to perform a second storage operation on a second plurality of blocks managed by the computing device, store, in the cache, an aggregated command record that indicates the second storage operation and an address range of the second plurality of blocks, the second storage operation representing an identical change to all blocks of the second plurality of blocks, wherein the first plurality of blocks and the second plurality of blocks exist within a universal address space; and upon flushing the aggregated command record from the cache to the persistent storage, perform the storage operation indicated by the aggregated command record over the address range indicated by the aggregated command record.

19. The computer program product of claim 18 wherein the second plurality of blocks are adjacent to each other within a data object managed by the computing device, the second plurality of blocks beginning and ending aligned to alignment boundaries within an address space of the data object.

20. The computer program product of claim 19, wherein the second command also commands performance of the second storage operation on additional blocks adjacent to the plurality of blocks within the address space of the data object outside of the alignment boundaries; and wherein the set of instructions, when performed by the computing device, further causes the computing device to:

in response to the computing device receiving the second command, store an additional command record for each block of the additional blocks in the cache, each additional command record respectively indicating an address of that block; and upon flushing the additional command record for each block of the additional blocks from the cache to the persistent storage, store data of that block at its indicated address.

21. The computer program product of claim 19, wherein the blocks within the data object managed by the computing device are located within the persistent storage with reference to a mapping tree indexed by their respective addresses, the mapping tree including leaf nodes that address a predetermined number of blocks that are adjacent within the address space of the data object, the blocks having a fixed block size;

wherein the alignment boundaries are separated by a fixed interval within the address space of the data object, the fixed interval being a unit fraction of the predetermined number of blocks multiplied by the fixed block size; and wherein performing the storage operation indicated by the aggregated command record over the address range indicated by the aggregated command record includes:

combining multiple aggregated command records having adjacent address ranges, the adjacent address ranges covering one entire leaf node of the mapping tree and the storage operation indicated by each of the multiple aggregated command records being an UNMAP command; and deleting the one entire leaf node from the mapping tree.

22. The computer program product of claim 21, wherein the predetermined number of blocks multiplied by the fixed block size is within a range of 1 megabyte (MB) to 16 MB; and wherein the fixed interval is within a range of 1 MB to 8 MB.

23. The computer program product of claim 19, wherein storing the aggregated command record in the cache includes storing the aggregated command record within an aggregated command record table of the cache;

wherein storing the command record for each block of the first plurality of blocks in the cache includes storing the command record for each block of the first plurality of blocks within a command record table of the cache separate from the aggregated command record table;

wherein each of the aggregated command records and the command records stored in the cache includes a respective sequence number assigned based on when it was stored in the cache; and wherein the set of instructions, when performed by the computing device, further causes the computing device to:

for a first command record stored in the command record table that (a) indicates a first address that is within an address range indicated by an overlapping aggregated command record stored within the aggregated command record table and (b) has a sequence number older than the sequence number of the overlapping aggregated command record, delete the first command record from the cache without flushing it to the persistent storage; and for a second command record stored in the command record table that (a) indicates a second address that is within the address range indicated by the overlapping aggregated command record and (b) has a sequence number newer than the sequence number of the overlapping aggregated command record, flush the second command record from the cache after flushing the overlapping aggregated command record to the persistent storage.

* * * * *